Feb. 13, 1945.   V. E. PRATT   2,369,248
READING AND PROJECTION APPARATUS
Filed July 17, 1942   4 Sheets-Sheet 1

INVENTOR
VERNEUR E. PRATT
BY
ATTORNEYS

Feb. 13, 1945.  V. E. PRATT  2,369,248
READING AND PROJECTION APPARATUS
Filed July 17, 1942    4 Sheets-Sheet 2

INVENTOR
VERNEUR E. PRATT
BY
ATTORNEYS

Feb. 13, 1945.　　　V. E. PRATT　　　2,369,248
READING AND PROJECTION APPARATUS
Filed July 17, 1942　　4 Sheets-Sheet 3
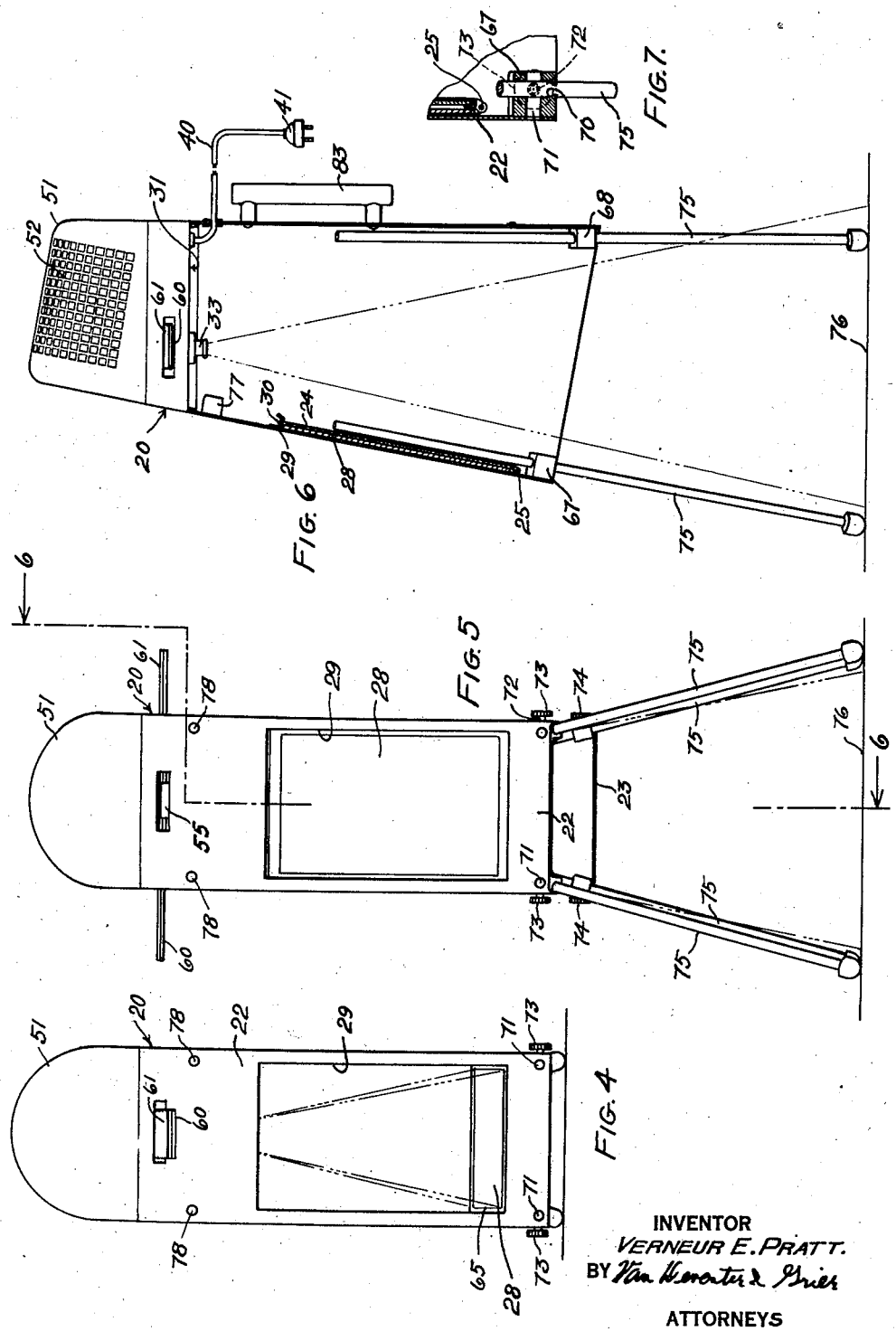
INVENTOR
*VERNEUR E. PRATT.*
BY
ATTORNEYS Feb. 13, 1945.   V. E. PRATT   2,369,248
READING AND PROJECTION APPARATUS
Filed July 17, 1942   4 Sheets-Sheet 4
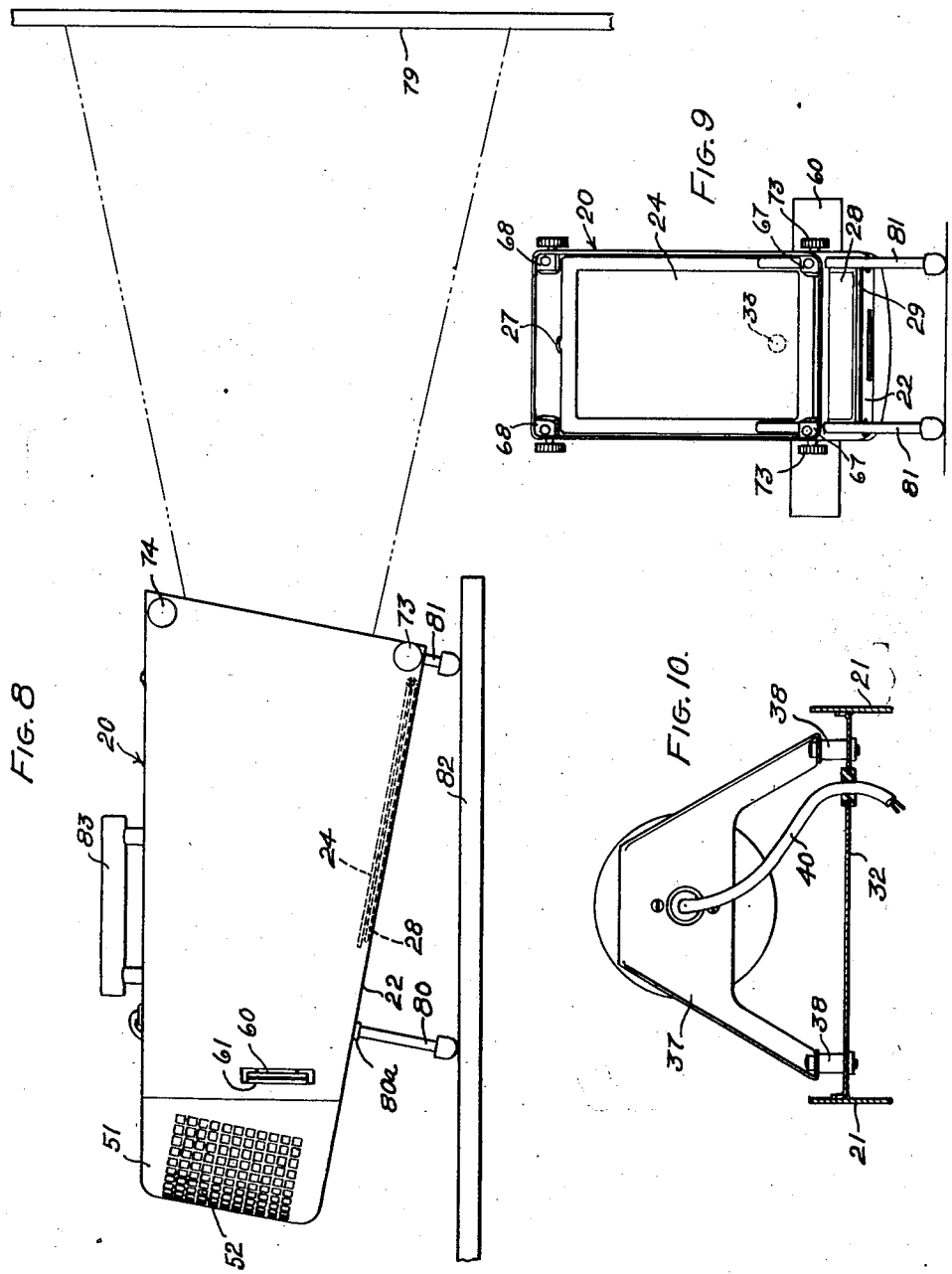
INVENTOR
VERNEUR E. PRATT.
BY
ATTORNEYS Patented Feb. 13, 1945

2,369,248

UNITED STATES PATENT OFFICE 2,369,248

READING AND PROJECTION APPARATUS

Verneur E. Pratt, Norwalk, Conn.

Application July 17, 1942, Serial No. 451,246

8 Claims. (Cl. 88—24)

The present invention pertains to improvements in reading and projection apparatus.

An object of the invention is to provide improved means by which printed matter, data and the like, recorded on microfilm, may be presented in enlarged form for reading or observation.

Another object is to provide apparatus of the above nature adapted to present the enlarged image by projection either on opaque or translucent screens.

A further object is to provide a single device of the above character adapted to present the enlarged image by downward projection on an inclined opaque screen within the casing of the device, by downward projection on a suitable surface below the device, by horizontal projection against a wall or the like, or by projection on a translucent screen viewable through the base of the projector.

Another object is to provide means to view images photographed either laterally or longitudinally on the film strip without rotation or other adjustment of the projection head.

A further object is to provide an improved lamp housing and mounting by which undue heat is prevented from reaching the film.

Another object is to provide a device of the type described, which is cheap, without complicated moving parts, and which is readily portable.

A further object is to provide a reading device of the above type which is compact, simple to operate, and well adapted to use by school children, college students and the reading public in general.

Other objects and advantages will become evident in the course of the following description in connection with the accompanying drawings, in which Figure 1 is a vertical sectional view of a preferred form of the invention;

Figure 4 is a reduced front elevation of the device as shown in Figure 1;

Figure 5 is a front elevation of the device as arranged for projection on a flat surface below the casing;

Figure 6 is a vertical partial sectional view in the planes 6—6, Figure 5;

Figure 7 is a fragmental detail sectional view of the adjustable leg mounting means;

Figure 8 is a side elevation of the device arranged for horizontal projection on a wall or the like;

Figure 9 shows the device arranged for projection on the translucent screen, the screen appearing in elevation through the bottom of the casing; and Figure 10 is a rear detail view of the lamp housing bracket and its heat-insulating mounting.

Figure 1:
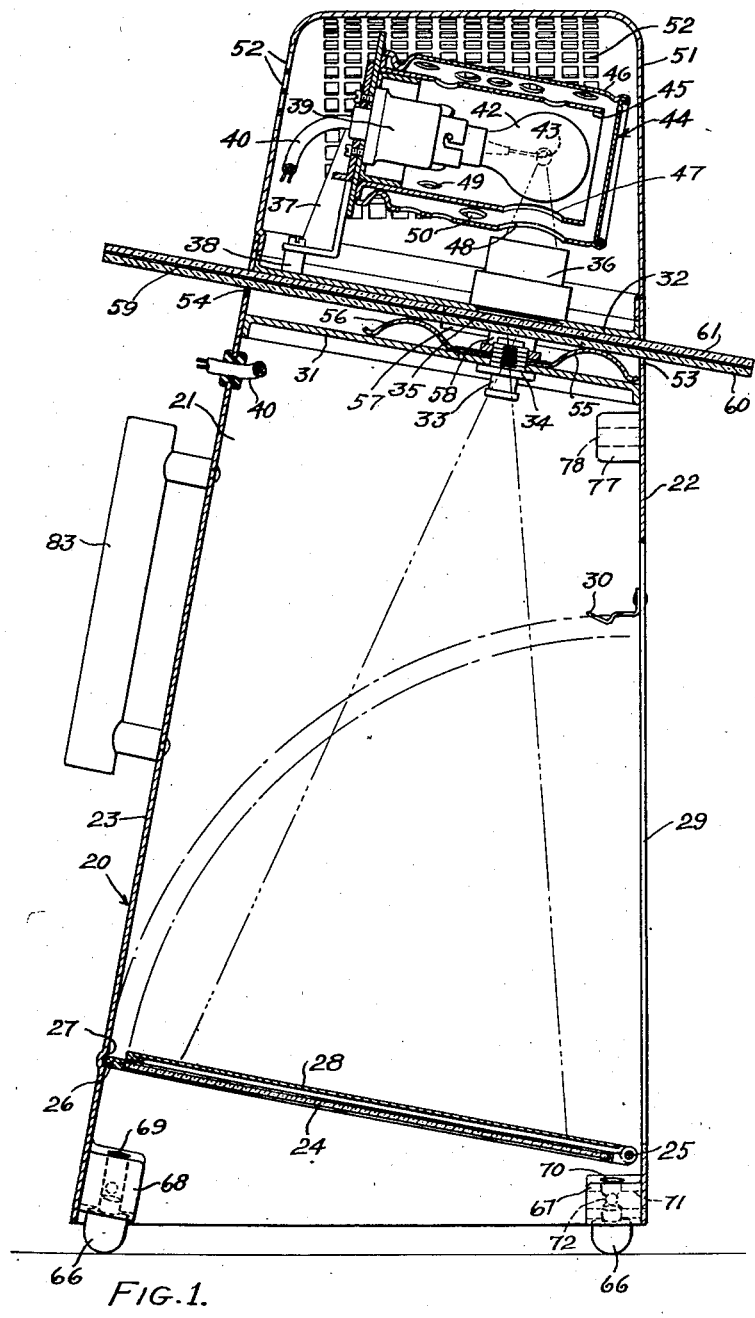

Referring to Figure 1, the numeral 20 generally indicates an upwardly tapered casing of substantially rectangular horizontal section, having side walls 21, a front wall 22, and a rear wall 23. A translucent screen member 24 is hinged on a transverse rod 25 in the lower front corner of the casing 20. A small boss or extension 26 on the rear edge of the screen member 24 is adapted to be swung into and held in a retaining depression or dimple 27 in the rear casing wall 23. An opaque screen 28 is also hinged on the rod 25 and normally rests by gravity on the top of the translucent screen member 24, the opaque screen having an upper surface suitable for receiving projected images.

In normal position as shown, the screens 24 and 28 are inclined upwardly with respect to the front wall 22, and a large rectangular window 29 is provided in the front wall through which the upper surface of the screen 28 may be readily viewed. When the device is used in alternative positions, as hereinafter set forth, one or both screens may be swung upward against the rear of the viewing window 29 in the manner indicated by dotted and dashed arcs, Figure 1. Small spring latches 30, secured to the inside of front wall 22 beside the window 29, are provided to catch and hold the translucent screen 24 in its upwardly swung position, in which position it also holds the overlying opaque screen 28. The opaque screen 28 is shorter than screen 24, and need not engage the latches 30, since when the device is to be used with the translucent screen 24 in operative position as shown in Figure 9, the front wall 22 is directed downward and the opaque screen 28 consequently rests against the inside of the window 29 by gravity.

A flat plate 31 is secured in the casing 20 near the top thereof, the plane of plate 31 being parallel to those of the screens 24 and 28 when the latter are in normal position as shown in Figure 1. A second plate 32, also parallel to the normal planes of screens 24 and 28, is secured in the casing 20 above and spaced from the plate 31.

A suitable projection lens system 33 is adjustably mounted in the lower plate 31 in any suitable manner, for instance by means of a friction collar 34. The upper plate is apertured at 35 and carries a condensing lens system 36 in optical alignment with the projection lens 33, the optical axis of the condensing and projection lens systems being perpendicular to the normal planes of screens 24 and 28.

Figure 2:
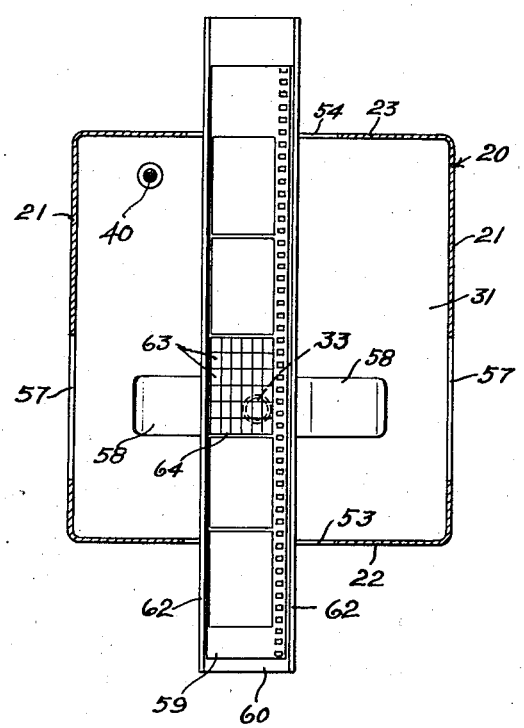
Figure 2 is a downwardly directed partial sectional view in the plane of the film, showing the film holder inserted through the front and rear slots for viewing page images with their upright axes disposed longitudinally on the film strip.

A bracket 37, shown in detail in Figures 1 and 10, is mounted above the rear top of the upper plate 32 on small posts 38, these posts being made of any suitable heat-insulating material. A forwardly directed lamp socket 39 is secured to the bracket 37, and is provided with a supply cord 40 passing downwardly through plates 32 and 31 as shown in Figures 10 and 2, and Figure 6, thence outward through rear casing wall 23. The cord 40 is of any desired length, and terminates in a suitable attachment plug 41, Figure 6.

The socket 39 holds a projection lamp 42, the filament 43 of the lamp being disposed in the optical axis of the condensing lens 36.

A housing 44 is detachably secured to the bracket 37 and encloses the lamp 42. The housing 44 comprises inner and outer shells 45 and 46 made of metal of substantial thickness and preferably colored black. Aligned apertures 47 and 48 respectively in the shells 45 and 46 permit passage of light from the lamp filament 43 to the condensing lens 36. Ventilating holes 49 are provided in the inner shell 45, and the outer shell 46 also has a plurality of similar holes 50, the ventilating holes in the two shells being staggered from each other to prevent direct escape of light therethrough. A hood 51, having a large number of ventilating perforations 52, is detachably mounted on the top of the casing 20 to enclose the described light source and related apparatus.

A horizontal slot 53 is provided in the front casing wall 22, and the rear wall 23 has a similar slot 54. The upper edges of these slots are flush with the bottom of the top plate 32, and the center line of the slots are in alignment with the optical axis of the lens system. Forwardly and rearwardly directed leaf springs 55 and 56 are secured to the lower plate 31, these springs being bowed upwardly toward the plate 42 in line between the slots 53 and 54. Similar slots 57 are provided in the casing side walls 21, these slots being in transverse line with the axis of the lens system as illustrated in section in Figures 2 and 3. Laterally directed leaf springs 58, similar to springs 55 and 56, are also secured to the lower plate 31 in line with the centers of slots 57.

Figure 3:
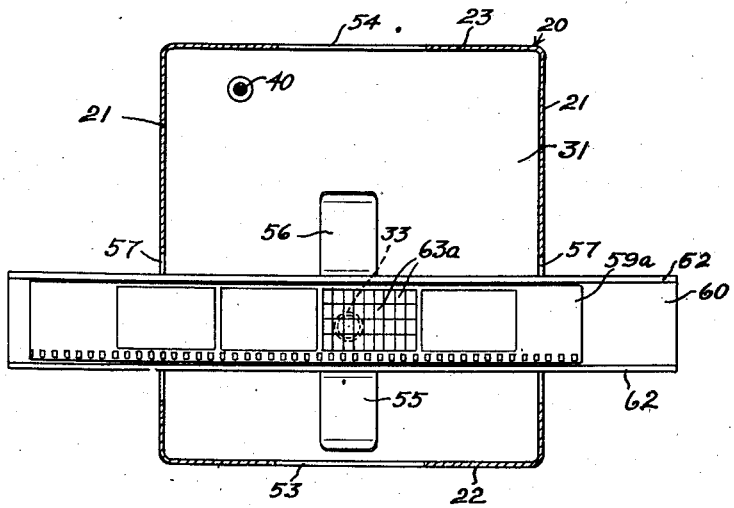
Figure 3 is a similar view with the holder inserted transversely through the side slots for viewing page images with their upright axes disposed transversely on the film strip.

In the preferred form of mounting, a strip of film 59 carrying the recorded images, is held between two slabs of glass 60 and 61, the slabs being secured together by any suitable means such as strips of Cellophane tape 62, Figures 2 and 3. In Figures 2 and 3, however, the upper glass slab 61 is removed in order to permit direct plan views of the film strips.

A typical embodiment of such a film strip is one on which the pages of a book are photographed, a large number of individual page images 63 being included in a normal film frame 64, Figure 2. While for purposes of illustration these small individual images are shown in only one main film frame in order to avoid unduly complicating the drawings, it will be understood that all the other frames may contain similar numbers of images, by which means a very large number of page images amounting to an entire book may be carried on a single short strip of film.

The page images may be arranged with their upright dimensions longitudinally of the film, as in Figure 2, or with the vertical dimensions laterally of the film, as in the case of images 63a on film 59a, Figure 3. In either case it is required that the projected images appear upright when viewed by an observer in front of the casing, the front being the lower side in Figures 2 and 3. In the first-mentioned case, that is with the longitudinally arranged upright page images, the slabs 62 and 63 holding the film 59 are inserted through the front and rear slots as illustrated in Figures 2 and 1, the insertion being made of course in the proper position to allow for reversal by the projection lens 33. The springs 55 and 56 press the glass slab and film strip combination upward in flat contact with the bottom of the upper plate 32, thus holding the film 59 in a fixed plane between the condensing lens 36 and the projection lens 33. The slots 53 and 54 are sufficiently wider than the slabs 60 and 61 to permit the latter to be shifted laterally to bring any desired portion of the film width within the scope of the optical system. Similarly the slabs may be shifted to any desired longitudinal position. Thus by longitudinal, lateral, or combined adjustment of the position of the film holder, any desired page image may be brought into registry with the lens system for illumination by light thrown thereon by the condensing lens 36 and for projection by the lens 33. The springs 55 and 56 exert sufficient pressure to hold the film holder in any set position at all times.

Similarly when the film carries page images orientated as illustrated in Figure 3, the holding slabs and film 59a are inserted through the side slots 57, thus bringing the laterally disposed page images 63a into position for upright projection. In this case the springs 58 hold the slabs and film in any selected position in the manner previously described.

From the foregoing description, it will be seen that the structure provides simple means for proper projection of either longitudinally or transversely orientated images without the necessity for rotatable projection heads or other comparatively complicated and cumbersome structures involving moving parts and adjustments.

For normal reading, the device stands upright with the screens 24 and 28 in inclined position as shown in Figures 1 and 4, the operator observing the projected image 65 on the opaque screen 28 through the front window 29. In ordinary upright position the device stands on small feet 66, preferably of rubber or the like, held in front and rear socket blocks 67 and 68 secured in the bottom corners of the casing 20.

Each of the two rear socket blocks 68 has an inclined hole 69 extending therethrough from top to bottom. Each front block 67 similarly has an up-and-down inclined hole 70 but also has an intersecting horizontal hole 71, shown in detail sectional Figure 7, this latter hole extending through the front plate 22. Clamping screws 72 provided with exterior knobs 73 are threaded into the front blocks 67 at the intersections of holes 70 and 71 therein. Similar clamping means 74 are provided for the rear blocks 68.

When it is desired to project a large image on a flat surface such as a table below the device, the feet 66 are removed from blocks 67 and 68, and the screens 24 and 28 are swung up against the back of the window 29. Extension legs 75, Figures 5 and 6, are inserted in the holes 69 and 70 and clamped therein by operating the exterior knobs 72 and 74. By the clamping means described, the legs 75 may be set to give any desired elevation of the device above the supporting surface 76, and by proper relative setting of the legs the device may be correctly levelled.

With the arrangement described, since the screens 24 and 28 are out of the cone of projection as shown in Figure 6, the image is projected through the bottom of the casing 20 on the surface 76 with an increased enlargement dependent on the additional height provided by the extension legs 75. The laterally outward inclination of the legs prevents any interference thereby with the cone of projection and allows unobstructed view of the projected image. Obviously the legs 75 may be made of suitable length to allow any desired degree of enlargement, the latter being limited only by the focal capacity of the lens and power of the lamp used.

It will be noted in Figures 1 and 6 that two additional socket blocks 77 are provided in the upper front corners of the casing 20. These blocks have substantially horizontal holes 78 extending through the front wall 22. The purpose of this provision is as follows:

When it is desired to use the device for projecting horizontally against a vertical wall or screen 79, Figure 8, the screens 24 and 28 are swung up to inoperative position as described above. Short rear legs 80 are inserted in the holes 78, two legs 81 are inserted in the horizontal holes 71 of the lower front blocks 67, and the device is placed front downward on a suitable support or table 82. The rear legs 80 may have stop flanges or rings 80a to determine their position in the holes 78, while the front legs 81 may be moved to any desired position in the blocks 67 and locked therein by the clamping knobs 73, thus providing means to adjust the position of the device on the table 82 to assure the correct desired angle of projection against the wall 79. Since both the interior screens 24 and 28 lie flat in the front of the device as shown in dotted lines in Figure 8, they are clear of the cone of projection, and projection to the wall 79 takes place through the bottom of the casing 20 without obstruction.

When it is desired to observe micro-filmed data by projection on the translucent screen 24, the device is arranged in substantially the same manner as described above for horizontal exterior projection, except that the screen 24 is swung upward into its normal position in retaining engagement with the depression or dimple 27 as shown in Figure 9, and the legs 81 may be adjusted to tip the lower end of the casing 20 upward, thus inclining the screen 24 at a convenient angle for easy viewing. In this position the opaque screen 28 rests flat by gravity against the inside of the front window 29, so that unobstructed projection takes place from the lens 33 to the translucent screen 24.

A handle 83, Figures 1, 6 and 8, is provided on the back of the casing 20 to facilitate carrying the device and arranging it in any of the positions described.

The device may be focussed by manually moving the projection lens system 33 in its sleeve 34, the operator inserting his hand either through the bottom of the casing 20 or through the window 29, depending on which of the described arrangements of the apparatus is to be used.

During projection substantially all the radiant heat from the lamp 42, except that necessarily directed through the light apertures 47 and 48, is rapidly absorbed by the closely enveloping inner housing sleeve 45, from which latter the heat is conveyed by a combination of radiation, convection and transmission to the outer sleeve 46 and bracket 37. Since the entire mounting of the bracket 37 and its attached light-source structures is through the insulating posts 38, practically no heat can be transmitted directly to the plate 32 and attached structures, so that the heat is dissipated from the bracket and lamp housing principally by convection and partly by radiation to the hood 51 and through the perforations 52 to the outer atmosphere. Due to the free ventilating provision and large surface of the hood 51, heat intercepted thereby is rapidly given up to the atmosphere with the consequence that any heat transmitted from the hood to the casing 20 is small in amount and dissipated over a large area. By the provision of the above structures and arrangements, the heat finding its way to the film 59 is practically negligible except for that due to the direct illumination, and even this latter heat is rapidly dissipated by the comparatively heavy glass slabs 60 and 61. Thus the device may be operated continuously with a lamp 42 of ample power without sufficient rise in temperature to endanger the film or inconvenience the operator. The advantage of this feature is obvious, particularly in such cases as operation by school children or other inexperienced persons.

During projection on the translucent screen 24 as shown in Figure 9, the opaque screen 28 acts substantially as a closure for the window 29, thus preventing extraneous light from entering to fog the image. Similarly, during exterior projection the screen 29 acts substantially as a closure against light passing either inward or outward.

From the foregoing description it will be seen that the invention comprises a simple, compact and easily operated universal reading or examining device for micro-filmed data, the device having a minimum of parts but providing for operation in any desired type of projection with either transversely or longitudinally arranged data images.

While the apparatus has been described in preferred form it is not limited to the precise structures set forth, as various modifications may be made without departing from the scope of the appended claims.

What is claimed is:

1. In a device of the character described, an upright casing having an open bottom and a viewing window in the front of said casing, a translucent screen within the bottom of said casing, an opaque screen normally overlying said translucent screen, means in said casing to project an image on said opaque screen, said image being viewable through said window, and hinging means connecting said opaque screen to said casing to permit said opaque screen to be swung against the back of said window and out of the path of projection of said projecting means whereby said projecting means may project an image on said translucent screen, said last named image being viewable through the bottom of said casing and said opaque screen forming substantially a closure for said window whereby extraneous light may be prevented from fogging said image on said translucent screen.

2. The invention as claimed in claim 1 wherein means are provided for hinging said translucent screen at the hinging means for the opaque screen in said casing, adapting said translucent screen to be moved clear of said path of projection, whereby said projecting means may project an image through said bottom to an exterior surface.

3. The invention claimed in claim 1 including means to space said casing above a supporting surface, and wherein means are provided for hinging said translucent screen at the hinging means for the opaque screen in said casing, adapting said translucent screen to be swung clear of said path of projection, whereby said projecting means may project an image through said bottom on said supporting surface, said translucent screen holding said opaque screen against the back of said window.

4. In a projecting device, in combination, a plate, having an aperture therethrough, a light condenser secured to one side of said plate in alignment with said aperture, a light source spaced from said condensing lens in optical alignment therewith, a radiant heat intercepting housing about said light source, said housing having a light aperture in line between said source and said condenser, a means including bracket holding said source and said housing in cooperative relationship, and heat-insulating means connecting said bracket and said plate, said heat-insulating means comprising the entire supporting means for said bracket, housing and light source on said plate.

5. The invention according to claim 4 wherein said heat insulating means comprises posts of material having low unit heat transmitting ability and small cross sectional areas.

6. The invention according to claim 4 including means to position a film holding means on the other side of said plate in operative registry with said aperture, condenser and light source.

7. The invention according to claim 4 wherein said plate is secured to one end of a casing, and including a hood of large superficial area secured to said casing and enclosing said light source, housing, and condenser, said hood having a plurality of ventilating openings therein.

8. In a projector, in combination, a light source, a housing closely enveloping said source and including heat absorbing, transmitting and emitting inner and outer shells, said shells having staggered ventilating holes therein, a supporting plate, heat insulating means secured to said plate, a bracket secured to said heat insulating means and spaced thereby from said plate, said bracket also supporting said light source and said housing whereby said insulating means forms a unitary support for said bracket, said source and said housing, means forming aligned light apertures in said shells and a condenser supported on said plate with its axis in alignment with said apertures and said light source.

VERNEUR E. PRATT.